United States Patent [19]
Cuneo

[11] Patent Number: 5,086,491
[45] Date of Patent: Feb. 4, 1992

[54] ELECTRONIC CONTROL CIRCUIT FOR A/C MOTORS

[75] Inventor: Giuseppe L. Cuneo, Bergamo, Italy

[73] Assignee: Black & Decker, Inc., Newark, Del.

[21] Appl. No.: 616,532

[22] Filed: Nov. 21, 1990

[30] Foreign Application Priority Data

Nov. 24, 1989 [IT] Italy ............... 22510 A/89

[51] Int. Cl.$^5$ ............................................. H02P 5/16
[52] U.S. Cl. .................................... 388/811; 388/919
[58] Field of Search ............... 388/829, 831, 919, 804, 388/811

[56] References Cited

U.S. PATENT DOCUMENTS

| | | |
|---|---|---|
| 3,443,188 | 5/1969 | Mortimer . |
| 3,564,372 | 2/1971 | Vogelsberg et al. . |
| 3,634,874 | 1/1972 | Mason . |
| 4,369,463 | 1/1983 | Lee ..................... 318/729 |
| 4,392,093 | 7/1983 | Paule et al. . |

Primary Examiner—David Smith, Jr.
Attorney, Agent, or Firm—Dennis A. Dearing; Charles E. Yocum; Edward D. C. Bartlett

[57] ABSTRACT

A control circuit for alternating current motors comprises a bidrectional controlled diode (TRIAC) connected in series to the motor and with its own control terminal connected to a fixed-phase actuating network in order to supply partial power to the motor. The control terminal is also connected to a switching device, piloted by a control signal to supply it, when closed, with a bias current which causes the continuous operation of the TRIAC, so as to supply full power to the motor. The control circuit can be used in conjunction with circuits which measure the current absorbed by the motor and give said control signal to make it switch from the full power condition to the partial power condition and vice versa whenever said current reaches pre-established thresholds. One of these circuits supplies partial power to the motor whenever the current it absorbs is too high, which indicates a mechanical overload. Another circuit supplies partial power to the motor whenever the current it absorbs is too low, which indicates no-load operation, so as to prevent overspeed.

9 Claims, 3 Drawing Sheets

ELECTRONIC CONTROL CIRCUIT FOR A/C MOTORS

BACKGROUND OF THE INVENTION

The present invention relates to an electronic control circuit for alternating current motors.

In known technology, the need to be able to switch an electric motor between full power condition and partial power condition in order to limit, for instance, its speed and/or the current absorbed and, consequently, the stress upon it, is frequently felt.

For example, some electric motors, in order to provide a high power-size ratio, use such windings that, when load-free and fully powered, they reach excessively high angular speeds, thus causing problems with regard to reliability and to safety standards. In an effort to get round these problems, control circuits have been produced which supply such motors with partial power whenever they are load-free, thus limiting the idling speed, and with full power whenever a load is exerted and therefore whenever the motor's full available power as required, without the risk of overspeed. In known technology, such circuits are usually produced with complex designs using expensive, special integrated control circuits or electromechanical systems using, for example, the centrifugal force produced by the rotation of the motor, which are unreliable in operation and often cumbersome in size.

Motors of the type just mentioned are, for instance, frequently used in portable electrical appliances for their favourable weight-power ratio. In such applications, it is obvious that the cost, compactness and safety of operation of the control circuit are features of primary importance and that known technology, as described, is barely satisfactory.

Another example of the need to switch between the two aforementioned conditions is the case when the current absorbed by an electric motor is to be limited to a maximum level, in order to prevent damage in the event of mechanical overloading. A special control circuit supplies full power to the motor as long as the amount of current absorbed does not exceed a predetermined level, above which the control circuit supplies the motor with partial power and, consequently, with reduced current thus safeguarding its integrity. In order to perform such an operation to avoid overloading, known technology relies on complex solutions which, for switching between the aforementioned power conditions, use expensive, special integrated circuits or bimetallic power cut-out devices, which are difficult to set and which operate in a discontinuous manner.

Limitation of current to avoid mechanical overload is also a feature which is desirable in portable electrical appliances given the extreme variability of the loads which such appliances may have to withstand when in use. In this case too, known technology proves to be unsatisfactory with regard to cost, compactness and safety of operation.

The general aim of the present invention is to prevent the above mentioned problems by providing a control circuit of simple construction, low cost and safe operation to supply alternating current motors, and particularly portable electrical appliances, with full power or partial power. A further aim of the present invention is to provide, with the said control circuit, a device for limiting the number of revolutions in no-load operations and, additionally, a device for limiting the current absorbed by AC motors.

BRIEF DESCRIPTION OF THE INVENTION

In view of these aims, the idea was to produce, according to the invention, an electronic control circuit for alternately supplying an electric motor, on command from a switching signal, with partial power or full power in alternating current characterised by the fact that it comprises a first bidirectional controlled diode (TRIAC) series connected to the motor in order to connect it, when in operation, to a source of power with a substantially sinusoidal wave, the control terminal of the TRIAC being connected to an actuating device controlling its operation, in each wave period of the power supply, for an interval of time shorter than the duration of this period, in order to achieve the aforementioned partial power; the control terminal of the TRIAC being connected moreover to a switching device which can be closed on command from the said switching signal to connect it to a source of bias current causing the continuous operation of the TRIAC, in order to achieve the aforementioned full power.

According to another aspect of the present invention, a further idea was to produce an automatic control device comprising the aforementioned control circuit, characterised by the fact that it comprises means for measuring the current flowing through the motor which produce a signal, which is a function of that current, at their output, the said output being connected to means of comparison with predetermined threshold values, in order to generate the aforementioned switching signal when the said function signal and, consequently, the said current pass through threshold levels of a predetermined value.

BRIEF DESCRIPTION OF THE DRAWINGS

In order to clarify the explanation of the innovative principles of the present invention and their advantages over known technology, there follows a description, supported by the appended drawings, of a possible example applying such principles.

In the drawings.

DETAILED DESCRIPTION OF THE INVENTION

Figure 1:
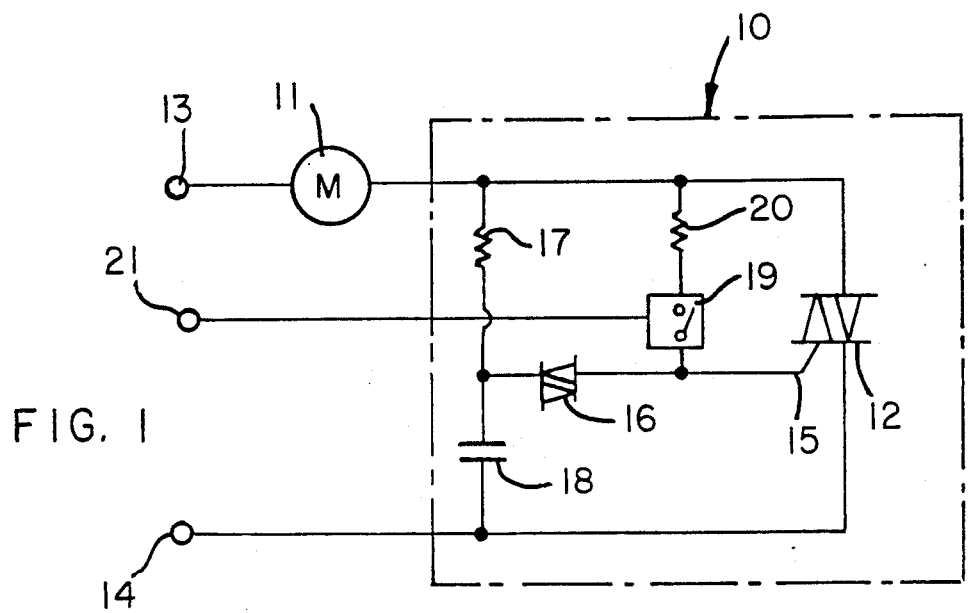
FIG. 1 represents a block diagram, according to the invention, of a control circuit for an AC motor.

With reference to the figures, FIG. 1 shows an outline of a control circuit, generally indicated by 10, produced according to the invention, for an AC electric motor 11. The motor is connected, via a bidirectional controlled diode (TRIAC) 12, to terminals 13 and 14 of an alternating current feeder.

The control terminal 15 of the TRIAC 12 is connected to a DIAC 16, the other terminal of which is connected to an RC network made up of a resistor 17 and a capacitor 18. The DIAC 16 and the RC network 17, 18 thus form a known fixed-phase control system for the TRIAC 12.

The control terminal of the TRIAC is also connected to a switching device which, when closed, is controlled by a signal applied to a terminal 21 in order to connect the control terminal 15, via a limiting resistor 20, to a level of potential which is high enough to actuate the TRIAC 12. Advantageously, this potential is taken at an anodic terminal of the TRIAC.

The value of the components, especially in the light of the following explanations regarding their operation, can easily be imagined by a technical expert.

The TRIAC 12 must be adapted, with regard to tolerable current and voltage characteristics and to dissipation power, to the characteristics of the motor 11 to be supplied. The values of the RC network 17, 18 must be such that it provides the phase delay corresponding to the partial power with which the motor is to be supplied, on command. The value of the resistor 20 must be sufficiently low so as to fully actuate the TRIAC when the controlled switch 19 is closed, but at the same time sufficiently high so as to limit the current flowing through the resistor, and, consequently, through the control terminal 15, to a value which is acceptable for the integrity of the components 12. By way of indication, a usable value may be around 1 kohm.

The circuit 10 operates as follows:

When power has been supplied to the terminals 13 and 14 (typically by the sinusoidal network), the full power or partial power conditions of the electric motor are controlled by a command signal to the terminal 21 closing or otherwise the controlled switch 19.

When the switch 19 is in an open position, the operation of the TRIAC 12 is actuated by the fixed-phase bias network 17, 18 and by the DIAC 16 and, as a technician will easily imagine, with a phase delay, set by the components 16, 17, 18, with respect to the shifting to zero of the sinusoidal power supply to the terminals 13 and 14. In this manner, the effective value of the voltage to the ends of the motor is reduced with respect to the full power supply and, consequently, the motor runs at a speed lower than the nominal rate.

When the switch 19 is in the closed position, however, the current activating the TRIAC 12 reaches its terminal 15 directly via the resistor 20 as a result of which it is kept in permanent operation so that the full power applied to the terminals 13 and 14 reaches the motor.

The controlled switch 19 may be of any known type such as a relay, for instance, or a semi-conductor device. Advantageously, it has been found that a second, low power, TRIAC can be used, as shown below.

Although the switching signal to the terminal 21 may be generated, for example, manually via a switch, simply in order to alternate the rotational speed of an electric motor between its nominal rate and a lower pre-set value, a dual-state control circuit as just described may be used advantageously in automatic control devices of a motor according to the current absorbed by the motor.

Figure 2:
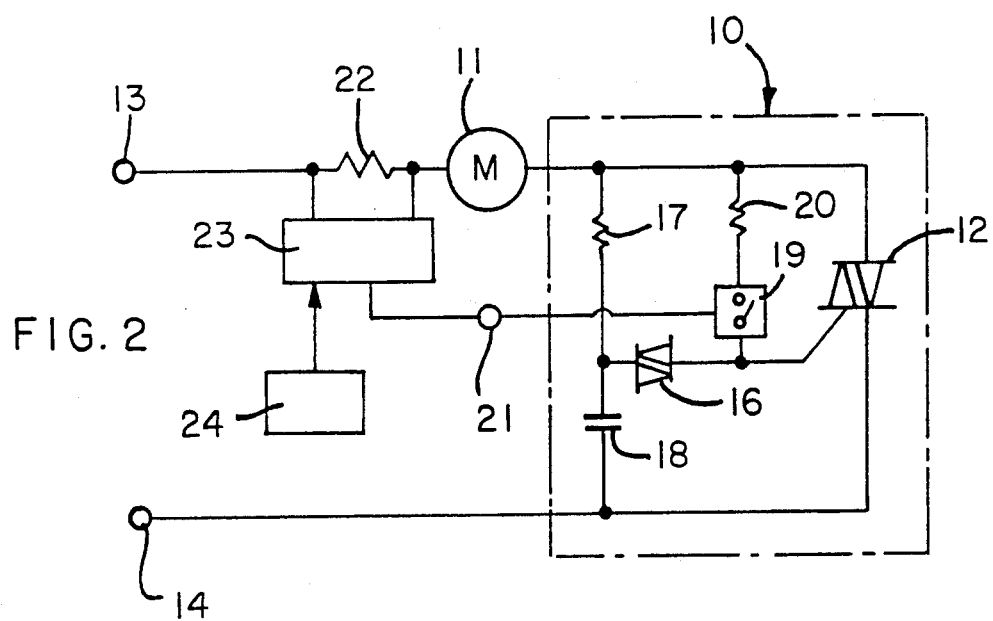
FIG. 2 represents a block diagram applying the circuit in FIG. 1 in order to produce an automatic control device for an AC motor according to the current absorbed by the motor.

For example, FIG. 2 shows such a device according to the present invention.

A low value measuring resistor 22 is series connected to the electric motor 11, in order to obtain a drop in voltage at the resistor terminals which is proportional to the current absorbed by the motor.

A measuring circuit 23 measures this drop in voltage and sends the command signal to the terminal 21 to switch between the two states of the control circuit 10 on crossing a threshold predetermined by a reference generator 24.

Taking the example of a case where the motor 11 is of a type which tends to overspeed in no-load operation, the circuit 23 may be set to close the switch 19 on measuring a current value which is higher than the no-load absorption level of the motor.

Thus, when the motor is in no-load operation, the controlled switch 19 is open and, therefore, the motor is supplied with partial power in order to run at a speed which is set by selecting from the values of the RC divider 17, 18 and which is situated within tolerated limits. On the other hand, if the motor is loaded, the current absorbed is sufficient to cause the device 23 to command the closure of the switch 19 so that the full power present at the terminals 13 and 14 is supplied to the motor.

If, instead, the motor is required to have some protection against overloading, it is sufficient to create the circuit 23 in such a manner that it commands the switch 19 to open on measuring a current absorbed by the motor which is higher than the safety limit. Thus, whilst the motor is absorbing an acceptable level of current, it can be supplied with full power. As soon as the level of absorbed current exceeds the predetermined level, the circuit 23 opens the switch 19, so that the motor is supplied with partial power, thus limiting the quantity of current absorbed to a safe level.

Figure 3:
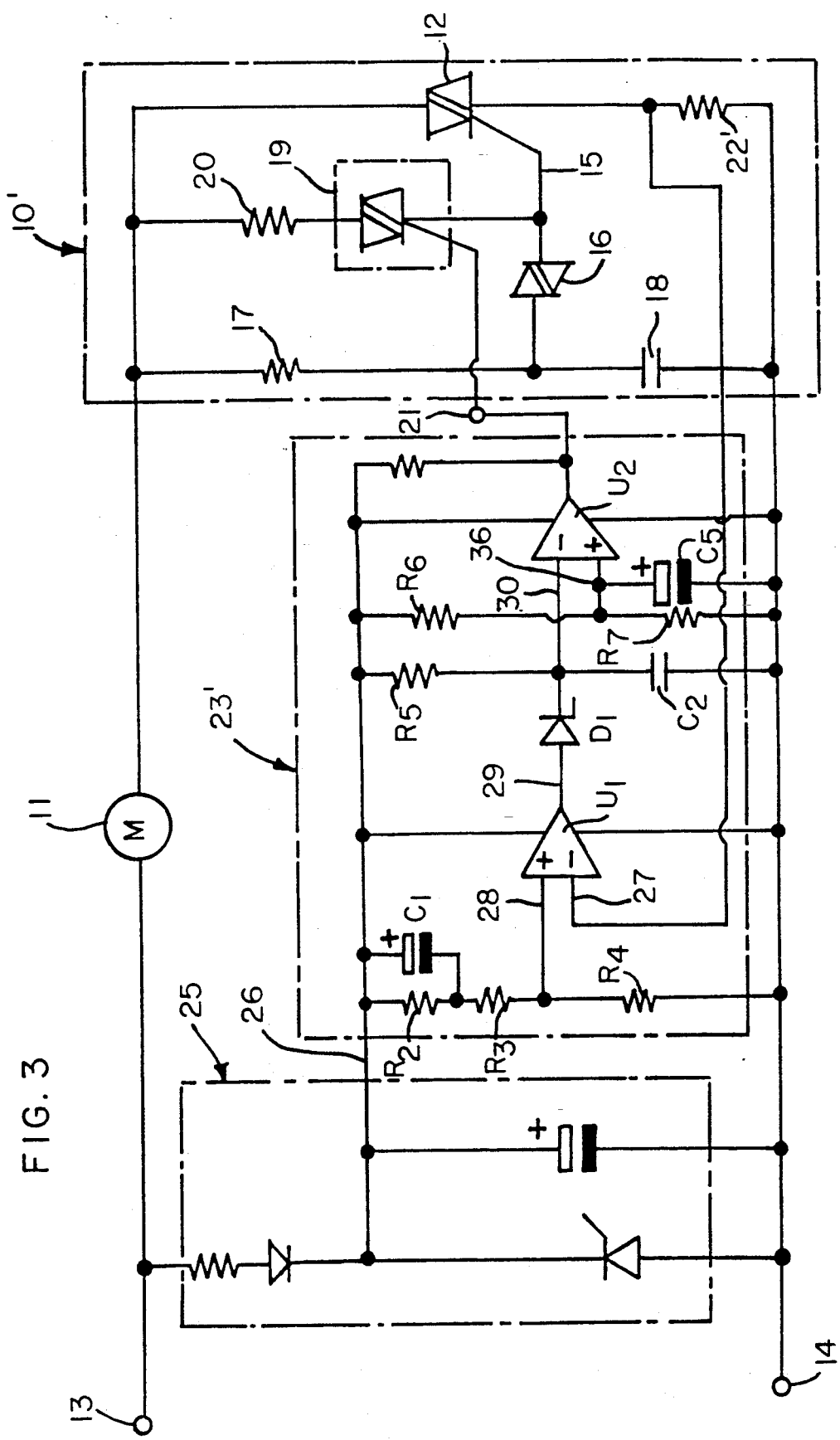
FIG. 3 represents a wiring diagram realizing what is shown in FIG. 2 in order to obtain a device for limiting the speed of an AC motor in no-load operation.

By way of an example, FIG. 3 shows a circuit diagram realizing, according to the innovative principles of the present invention, a control device to limit the maximum speed of the motor in no-load operation.

The measuring circuit 23', of the type indicated by 23 in FIG. 2, is produced with operational amplifiers U1 and U2 powered by the line voltage at terminals 13 and 14 through a rectification, reduction and stabilization circuit, generally indicated by 25, which will be quite comprehensible to a technician and therefore described no further, in order to provide a suitable supply of direct voltage to point 26.

The control circuit to alternate between the two power conditions for the motor is indicated by 10'. This circuit 10' is substantially equal to the circuit 10 in FIGS. 1 and 2, the only variation being that a measuring resistor 22' has been inserted, series connected to the TRIAC 12 so as to be substantially crossed by the current absorbed by the motor, in the same way and with the same function as the resistor 22 in FIG. 2. The difference in the position of the measuring resistor between FIG. 2 and FIG. 3 is due exclusively to convenience in the particular circuit diagram of the measuring system 23 as shown in FIG. 3.

The drop in voltage at resistor 22' is applied to the inverting input 27 of the first operational amplifier U1, the other input 28 of which is powered by a direct reference voltage, less than the minimum peak voltage of interest at the measuring resistor 22", taken from a voltage divider made up of the resistors R2, R3, R4 and the capacitor C1 which eliminates any ripples and disturbances.

At the output 29 of the operational amplifier U1, a substantially rectangular wave is thus obtained with a duty cycle (i.e. the relationship between the high level and the low level) inversely proportional to the current (with sinusoidal flow) crossing the measuring resistor 22'.

This square wave is sent through a Zener diode D1 to a network made up of a capacitor C2 and a resistor R5, thus forming a filter to extract direct voltage, proportional to the average value of the rectangular wave, applied to the inverting input 30 of the second operational amplifier U2. The current absorbed by the motor will be higher and the direct voltage present at point 30 will be lower.

A direct reference voltage is applied at the noninverting input 36 of the operational amplifier U2. This is extracted from a resistive divider formed by resistors R6 and R7, and filtered by a capacitor C5. A voltage comparator circuit is thus obtained.

At the output of the operational amplifier U2, a command signal will be obtained for terminal 21 of the control circuit 10', as described above for circuit 10. In particular, the voltage level at terminal 21 will be high if the voltage at input 30 is lower than the reference voltage at input 36. The voltage level will be low, however, if the opposite conditions are observed.

As shown again in FIG. 3, the switch controlled by the signal 21, and previously indicated in FIGS. 1 and 2 as 19, is made up of a TRIAC. In this way, when the signal 21 is high, this TRIAC 19 comes into operation and the motor is supplied with full power. When the signal 21 is low, however, the TRIAC 19 is cut off and the motor is supplied with a partial wave as described above.

It will be clear to a technician how the divider R6, R7 acts as the reference generator illustrated by 24 in FIG. 1. In fact, the reference voltage at point 36 provides a threshold for the operation of the dual-state control circuit 10'.

If the current absorbed by the motor is lower than a certain value, which is best selected barely higher than the no-load current of the motor, the voltage at point 30 will be higher than the threshold. In this way, the motor, when it is load-free, is supplied with partial power thus preventing overspeed.

If the current absorbed by the motor is higher than the aforementioned certain value, the voltage at point 30 will be higher than the threshold, so that the motor is supplied with full power. In this way, as soon as the motor is loaded and there is, therefore, no risk of overspeed, the motor is supplied with its normal operating power.

Figure 4:
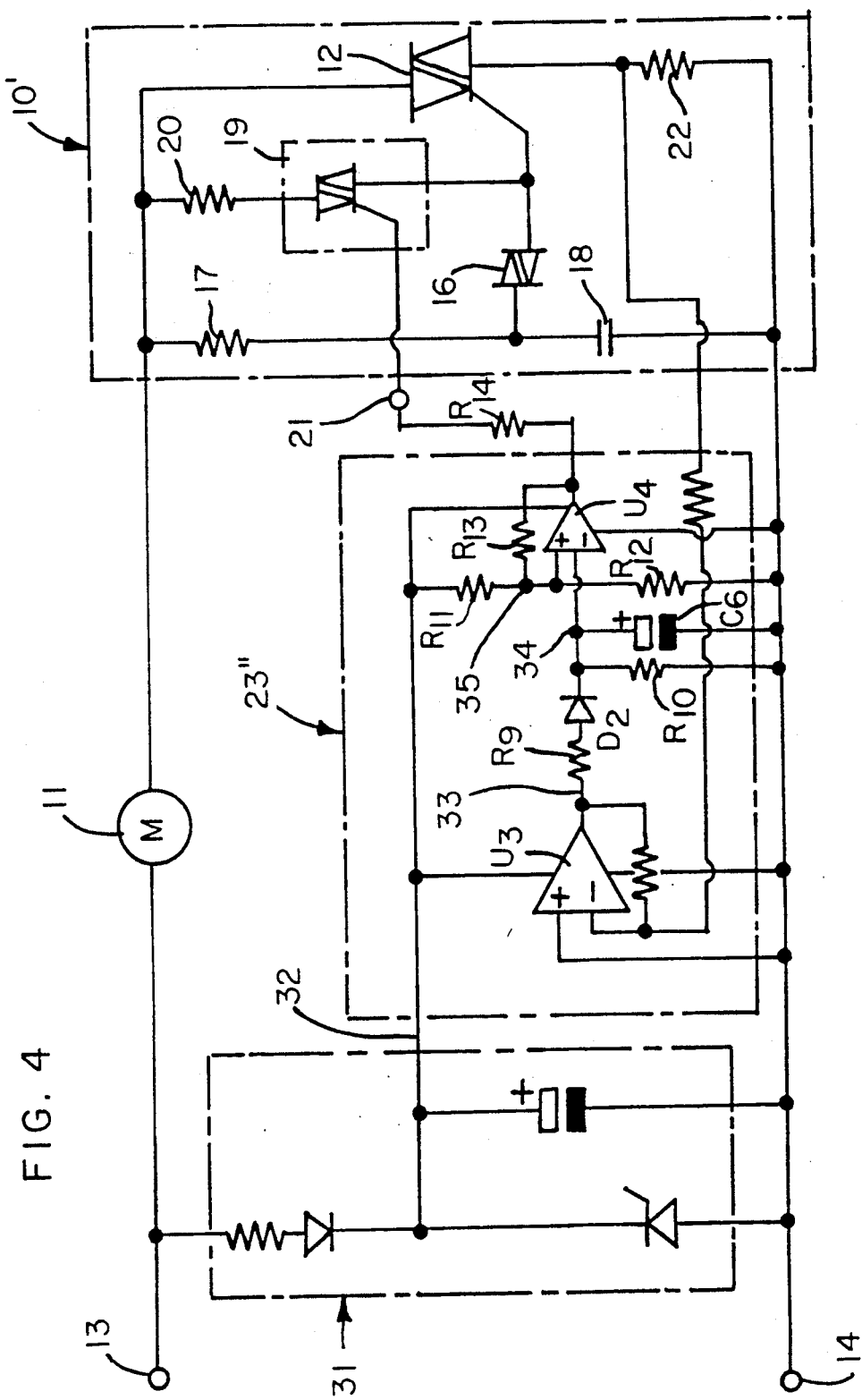
FIG. 4 represents a wiring diagram realizing what is shown in FIG. 2 in order to obtain a device for limiting the current absorbed by an AC motor.

A further wiring diagram is shown in FIG. 4, exemplifying a control system, again created according to the innovative principles claimed herein, which limits the current absorbed by an electric motor.

As illustrated in this figure, in order to achieve the particular application, the measuring circuit 23", again of the type previously shown in FIG. 2 by 23, is made up of two operational circuits U3 and U4, supplied from the line voltage by a rectification, reduction and stabilization circuit, generally indicated by 31, in the same way as the circuit in FIG. 3, in order to obtain a suitable supply of direct voltage to point 32.

The operational circuit U3, connected in a known amplifier configuration, amplifies to a half wave the drop in voltage present at the measuring resistor 22' which is series connected to the power TRIAC.

The pulse wave, the amplitude of which is proportional to the current absorbed by the motor, present at output 33 of the operational amplifier U3, is converted into direct voltage proportional to its average value by means of the filter made up of the components R9, D2, R10 and C6, as a technician will easily be able to imagine. The direct voltage value thus obtained is applied to the inverting input 34 of the operational amplifier U4 creating, by means of a resistive divider R11, R12 and a feedback resistor R13, a comparator with a hysteresis.

The comparator output is sent, through a resistor R14, to the control terminal 21 of a control circuit of the type illustrated by 10 in FIGS. 1 and 2 and which, as seen in FIG. 4, comprises a second, low power, TRIAC as a controlled switch 19.

The operation of a circuit constructed in this manner will easily be intuitable to a technician.

The resistive divider connected to the non-inverting input of the operational amplifier U4 establishes a threshold value for the maximum current which can be absorbed by the motor. In order that the direct voltage value present at point 34, and a function of the current flowing through the motor, is lower than the established threshold value, there will be a high voltage level at the output of the comparator U4 and, consequently, the TRIAC 19 will be in operation and, through the TRIAC 12, the motor will be supplied with full power. If the current of the motor exceeds the established acceptable limit, because of an excessively high mechanical load, the voltage at point 24 will surpass the threshold level 35 and the comparator will lower its output, de-energizing the TRIAC Q3, and, consequently, the motor will be supplied with partial power in order to limit the current flowing through the motor to an acceptable level.

When the overload conditions have come to an end, the circuit 23 reactivates the TRIAC 19 and the motor is therefore supplied with full power once more.

To its advantage, the presence of the resistor R13 inserts a hysteresis in the comparator, slightly shifting its threshold of intervention between the super-threshold condition and the sub-threshold condition, as is well known in the field, in a direction opposite to the direction of movement towards the threshold, in order to avoid instability due to the reduction of current absorbed by the motor, not to decrease the load conditions, but simply to decrease the supply voltage due to its partiality.

From the descriptions given, it can be seen how, with a circuit of the type illustrated by 10 (or 10') according to the innovative principles of the present invention, it is simple to produce control devices to switch between the two power supply conditions for an AC electric motor.

Naturally, the designs described above are quoted for the purposes of exemplifying the innovative principles of the present invention and must not, therefore, be understood as limitations to the claimed scope of the patent.

For example, the resistive dividers for generating the threshold value may be made up of variable resistors, in order to be able to regulate the thresholds in a continuous and precise manner.

As well as being made with two operational amplifiers, a measuring circuit 23 may also be produced with other circuitry using discrete or other components, as a technician will easily be able to imagine.

It is also clear how the circuit solutions illustrated in FIGS. 3 and 4, with appropriate modifications, can be used either in a speed-limiting circuit or a current-limiting circuit. For instance, the speed limiter may use as a circuit for converting the current absorbed by the motor into direct voltage for this function, the circuit for the corresponding function shown in FIG. 4 for the current limiter. In order to do this, the connections between them between the inverting input and the non-inverting input of the comparator U2 naturally need to be changed in order to correctly activate or otherwise the controlled switch designed in the form of the TRIAC 19, the directions of the variation in direct voltage according to the current absorbed by the motor being the opposite in each case.

I claim:

1. An automatic control device, comprising:

an electronic control circuit for alternately supplying an electric motor, on command by a switching signal, with partial or full power in alternating current;

said electronic control circuit comprising a first TRIAC connected in series to the motor for connecting the motor, in operation, to a source of power with a substantially sinusoidal wave;

said TRIAC having a control terminal connected to an actuating device controlling operation of said TRIAC, in each wave period of the power supply, for an interval of time shorter than the duration of such period, in order to achieve said partial power;

the control terminal of said TRIAC also being connected to a switching device which is closed on command by said switching signal to connect said TRIAC to a source of bias current to effect continuous operation of said TRIAC and achieve said full power;

means for measuring the current flowing through the motor and for producing a current signal that is a function of that current at an output of said measuring means;

comparing means, having an input connected to said measuring means output, for comparing said current signal with a preestablished threshold value;

said switching signal being generated when said current signal passes through said pre-established threshold value;

said measuring means comprising a measuring resistance connected to pass the current flowing through the motor, and a conversion circuit which converts any drop in voltage across said measuring resistance into a continuous electrical quantity which is a function thereof;

the conversion circuit comprising an operational amplifier having an inverting input, a non-inverting input, and an output;

said operational amplifier being connected by said inverting input to said measuring resistance and by said non-inverting input to a resistive divider;

said resistive divider supplying a reference level lower than the peak of the voltage drop across said measuring resistance in order to generate at the output of said operational amplifier a signal with a rectangular waveform and duty cycle;

an RC filter circuit connected to the output of said operational amplifier via a diode; and said rectangular waveform signal being a function of the current passing through said resistance and said RC filter circuit to supply at the output of said measuring means, as a continuous electrical quantity, a continuous voltage which is a function of the average value of the rectangular waveform signal.

2. A device as claimed in claim 1, wherein full power is delivered to the motor whenever the current exceeds a threshold level substantially equal to the no-load absorption of the motor.

3. Device as claimed in claim 1, wherein partial lower is delivered to the motor whenever the current exceeds a threshold level substantially equal to a pre-established maximum current value.

4. An automatic control device, comprising:

an electronic control circuit for alternately supplying an electric motor, on command by a switching signal, with partial or full power in alternating current;

said electronic control circuit comprising a first TRIAC connected in series to the motor for connecting the motor, in operation, to a source of power with a substantially sinusoidal wave;

said TRIAC having a control terminal connected to an actuating device controlling operation of said TRIAC, in each wave period of the power supply, for an interval of time shorter than the duration of such period, in order to achieve said partial power;

the control terminal of said TRIAC also being connected to a switching device which is closed on command by said switching signal to connect said TRIAC to a source of bias current to effect continuous operation of said TRIAC and achieve said full power;

means for measuring the current flowing through the motor and for producing a current signal that is a function of that current at an output of said measuring means;

said measuring means output being connected to comparing means having a pre-established threshold value;

said switching signal being generated when said current signal passes through said pre-established threshold value;

said measuring means comprising a measuring resistance connected to pass the current flowing through the motor, and a conversion circuit which converts any drop in voltage across said measuring resistance into a continuous electrical quantity which is a function thereof;

said conversion circuit comprising an operational amplifier having an inverting input and a non-inverting input;

said amplifier being connected to said measuring resistance in order to generate at an output of said amplifier a pulsing amplitude signal; and an RC filter circuit connected to the amplifier output via a diode whereby a continuous voltage is supplied at the output of said measuring means and said continuous voltage is a function of said pulsing signal.

5. Device as claimed in claim 4, wherein the comparator circuit comprises a hysteresis which during the switching shifts the threshold of intervention in a direction opposite to the direction of movement through the threshold of the continuous voltage.

6. A control circuit as claimed in claim 4, wherein the actuating device comprises a fixed-phase bias network which actuates the operation of the TRIAC with a pre-established delay with respect to the shifting to zero of the wave of the power supply.

7. A control circuit as claimed in claim 6, wherein the fixed-phase bias network comprises an R-C divider and a DIAC connected between the central point of the latter and said control terminal of the TRIAC.

8. A control circuit as claimed in claim 4, wherein the bias current causing the continuous operation of the TRIAC is limited by a resistance connected in series to the switching device.

9. A control circuit as claimed in claim 4, wherein the switching device is made in the form of a second TRIAC whose control terminal constitutes a terminal for application of said switching signal.

* * * * *